(12) United States Patent
Gupta et al.

(10) Patent No.: US 11,789,855 B2
(45) Date of Patent: Oct. 17, 2023

(54) SYSTEM AND METHOD FOR TESTING CLOUD HYBRID AI/ML PLATFORMS

(71) Applicant: JPMorgan Chase Bank, N.A., New York, NY (US)

(72) Inventors: Akhilesh Gupta, West Chester, PA (US); Purushothaman Jegatheesan, Frisco, TX (US); Anupam Arora, Middletown, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 110 days.

(21) Appl. No.: 17/645,787

(22) Filed: Dec. 23, 2021

(65) Prior Publication Data
US 2023/0205681 A1 Jun. 29, 2023

(51) Int. Cl.
G06F 11/36 (2006.01)
(52) U.S. Cl.
CPC ...... *G06F 11/3688* (2013.01); *G06F 11/3664* (2013.01)
(58) Field of Classification Search
None
See application file for complete search history.

(56) References Cited

U.S. PATENT DOCUMENTS

| | | | | |
|---|---|---|---|---|
| 9,992,086 | B1 * | 6/2018 | Mizik | H04L 43/20 |
| 11,108,673 | B2 * | 8/2021 | Kludy | G06F 11/3055 |
| 11,265,236 | B1 * | 3/2022 | Yousouf | H04L 43/0817 |
| 11,334,468 | B2 * | 5/2022 | Géhberger et al. G06F 11/0757 | |
| 2014/0130036 | A1 * | 5/2014 | Gurikar | G06F 8/62 717/176 |
| 2015/0131001 | A1 * | 5/2015 | Cho | H04N 7/0117 348/441 |
| 2019/0089618 | A1 * | 3/2019 | Kludy | G06F 11/3006 |
| 2019/0155577 | A1 * | 5/2019 | Prabha | G06Q 10/0635 |
| 2022/0263890 | A1 * | 8/2022 | Rao Krishnagi | H04L 67/1036 |
| 2023/0134277 | A1 * | 5/2023 | K | G06F 11/3664 717/125 |

OTHER PUBLICATIONS

Alhamazani, "An overview of the commercial cloud monitoring tools: research dimensions, design issues, and state-of-the-art", 2015, Springer-Verlag (Year: 2015).*

* cited by examiner

*Primary Examiner* — Hossain M Morshed
(74) *Attorney, Agent, or Firm* — GREENBLUM & BERNSTEIN, P.L.C.

(57) ABSTRACT

A method for performing a health check of a customized function across multiple cloud/hybrid platforms is disclosed. The method includes submitting a customized function to a health check system, which includes components on both on an on-premise network and a public cloud network. The submitted function is then uploaded to a cloud object storage. The method further includes having the customized function retrieved from the cloud object storage and scheduling an execution of the customized function according to a user defined schedule. Once the customized function is executed, the method further acquires results of the executed function and corresponding metrics and updates a health check metrics table of a metadata database with the acquired results and metrics.

20 Claims, 6 Drawing Sheets

200

300

SYSTEM AND METHOD FOR TESTING CLOUD HYBRID AI/ML PLATFORMS

TECHNICAL FIELD

This disclosure generally relates to a system and method for testing of customized functions across multiple platforms, more specifically, for testing of the customized functions across multiple cloud/hybrid platforms.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Presently, testing automation tools are designed for testing traditional applications hosted on a local network. Anything non-traditional typically requires writing extensive custom tests by developers. Although cloud network has provided many conveniences and new capabilities, including provisioning and running of jobs thereon, such capabilities may be unable to be tested without help of custom coding by experienced developers. Accordingly, various functions may be released to cloud based applications without adequate testing being performed, leading to frequent failures and downtimes, as well as inefficient utilization of technical resources as a result. Further, functions requiring cloud based services may be unable to properly perform system integrated testing or user acceptance testing, and performance metrics may be difficult to obtain, leading to various inefficiencies (e.g., longer downtimes, wasted CPU and memory utilization, and the like).

SUMMARY

According to an aspect of the present disclosure, a method for performing a health check on a user configured function is provided. The method includes performing, using a processor and a memory: submitting, via a user interface and over a public cloud network, a function and a corresponding meta file to a health check system; uploading the function to a cloud object storage and storing in the cloud object storage; validating the meta file; when the meta file is validated, validation result is sent to a plugin master table of a metadata database for storage, and the function is retrieved from the cloud object storage by a private cloud network; validating, on the private cloud network, the function; when the function is validated, a status of the function is updated in the plugin master table, and a schedule for execution of the validated function is added to a health check master table of the metadata database; the added schedule of the validated function is fetched at a predetermined interval for scheduling of execution of the function; scheduling the function for execution according to a schedule defined for the function; executing the function as specified in the defined schedule as a separate process; and acquiring results of the executed function and updating a health check metrics table of the metadata database with the acquired results.

According to another aspect of the present disclosure, the method further includes acquiring metrics corresponding to the results of the executed function and updating the health check metrics table.

According to another aspect of the present disclosure, the method further includes accessing information stored in the health check metrics table; and displaying a portion of the accessed information from the health check metrics table on a dashboard provided on a display screen.

According to yet another aspect of the present disclosure, the define schedule specifies a frequency of execution of the function.

According to another aspect of the present disclosure, the executing of the function includes calling a service provided on at least one of the private cloud network, the public cloud network, and an on-premise network.

According to a further aspect of the present disclosure, the health check system includes components from both the private cloud network and the public cloud network.

According to yet another aspect of the present disclosure, the function is for an application or an API residing on the private cloud network, the public cloud network, or an on-premise network.

According to a further aspect of the present disclosure, a system integration testing is performed for the function by submitting the function and the corresponding meta file, and by specifying a testing environment on the user interface.

According to another aspect of the present disclosure, the method further includes accessing information stored in the health check metrics table; performing a database query on the health check metrics table for performing analytics; and generating a report based on the performed database query.

According to a further aspect of the present disclosure, the report indicates an uptime for an application or API corresponding to the function executed.

According to a further aspect of the present disclosure, the executing of the function includes performing a regression test on the function.

According to a further aspect of the present disclosure, the executing of the function includes performing a performance test on the function.

According to a further aspect of the present disclosure, the method further includes repeating execution of the function at a frequency specified in the defined schedule; and acquiring additional results of the executed function every time the function is executed, and updating the health check metrics table with the acquired additional results.

According to a further aspect of the present disclosure, a health check master functional identification (ID) is used to submit the function, and the health check master functional ID is used to retrieve the function from the cloud object storage.

According to another aspect of the present disclosure, a user's functional ID is used to access one or more services, APIs or platforms from the private cloud network and the public cloud network when executing the function.

According to another aspect of the present disclosure, the function is retrieved from the cloud object storage at predetermined intervals.

According to another aspect of the present disclosure, the function is retrieved from the cloud object storage and validated by a health check plugin onboard Dameon process executed on the private cloud network.

According to another aspect of the present disclosure, the validating of the function includes: scanning the function and installing missing packages; testing the function for runtime errors; and validating return parameters.

According to another aspect of the present disclosure, a system for performing a health check of a user configured function is disclosed. The system includes at least one processor; at least one memory; and at least one communication circuit. The at least one processor is configured to: submit, via a user interface and over a public cloud network, a function and a corresponding meta file to a health check system; upload the function to a cloud object storage and store in the cloud object storage; validate the meta file; when the meta file is validated, validation result is sent to a plugin master table of a metadata database for storage, and the function is retrieved from the cloud object storage by a private cloud network; validate, on the private cloud network, the function; when the function is validated, a status of the function is updated in the plugin master table, and a schedule for execution of the validated function is added to a health check master table of the metadata database; the added schedule of the validated function is fetched at a predetermined interval for scheduling of execution of the function; schedule the function for execution according to a schedule defined for the function; execute the function as specified in the defined schedule as a separate process; and acquire results of the executed function and updating a health check metrics table of the metadata database with the acquired results.

According to another aspect of the present disclosure, a non-transitory computer readable storage medium that stores a computer program for performing a health check of a user configured function is disclosed. The computer program, when executed by a processor, causing a system to perform a process including submitting, via a user interface and over a public cloud network, a function and a corresponding meta file to a health check system; uploading the function to a cloud object storage and storing in the cloud object storage; validating the meta file; when the meta file is validated, validation result is sent to a plugin master table of a metadata database for storage, and the function is retrieved from the cloud object storage by a private cloud network; validating, on the private cloud network, the function; when the function is validated, a status of the function is updated in the plugin master table, and a schedule for execution of the validated function is added to a health check master table of the metadata database; the added schedule of the validated function is fetched at a predetermined interval for scheduling of execution of the function; scheduling the function for execution according to a schedule defined for the function; executing the function as specified in the defined schedule as a separate process; and acquiring results of the executed function and updating a health check metrics table of the metadata database with the acquired results.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
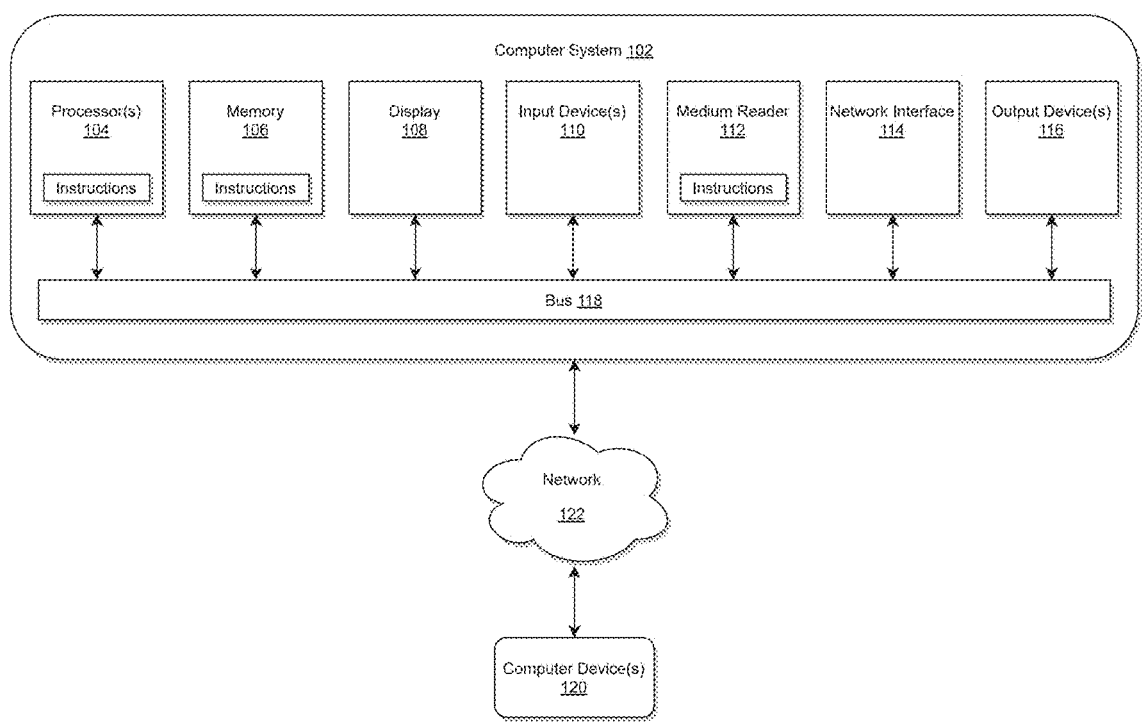
FIG. 1 illustrates a computer system for implementing a health check system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a health check system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
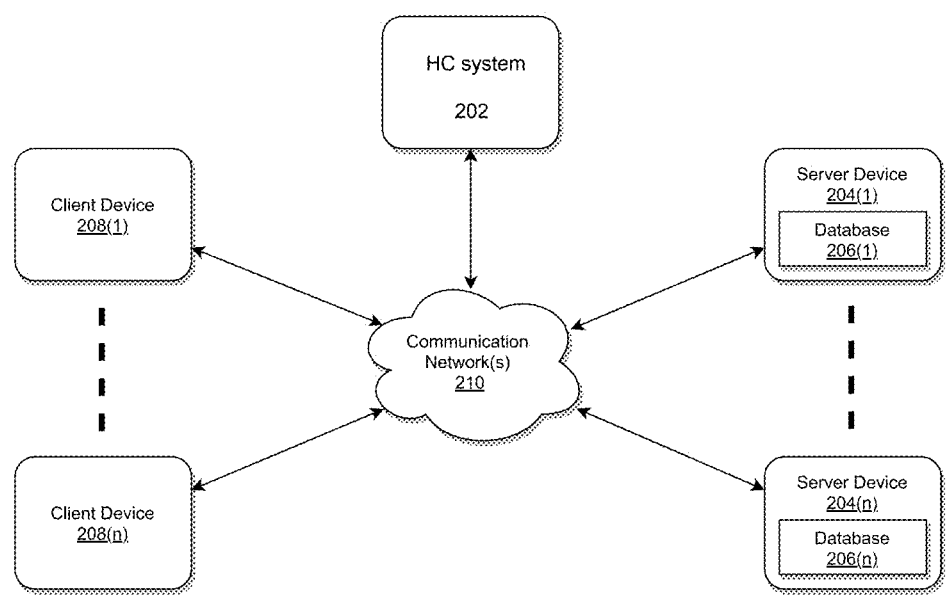
FIG. 2 illustrates an exemplary diagram of a network environment with a health check system in accordance with an exemplary embodiment.

FIG. 2 illustrates an exemplary diagram of a network environment with a health check system in accordance with an exemplary embodiment.

A health check (HC) system 202 may be the same or similar to the computer system 102 as described with respect to FIG. 1.

The HC system 202 may store one or more applications that can include executable instructions that, when executed by the HC system 202, cause the HC system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the HC system 202 itself, may be located in virtual server(s) running in a cloud-based computing environment rather than being tied to one or more specific physical network computing devices. Also, the application(s) may be running in one or more virtual machines (VMs) executing on the HC system 202. Additionally, in one or more embodiments of this technology, virtual machine(s) running on the HC system 202 may be managed or supervised by a hypervisor.

In the network environment 200 of FIG. 2, the HC system 202 is coupled to a plurality of server devices 204(1)-204(n) that hosts a plurality of databases 206(1)-206(n), and also to a plurality of client devices 208(1)-208(n) via communication network(s) 210. A communication interface of the HC system 202, such as the network interface 114 of the computer system 102 of FIG. 1, operatively couples and communicates between the HC system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the HC system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The HC system 202 may be a standalone device or integrated with one or more other devices or apparatuses, such as one or more of the server devices 204(1)-204(n), for example. In one particular example, the HC system 202 may be hosted by one of the server devices 204(1)-204(n), and other arrangements are also possible. Moreover, one or more of the devices of the HC system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the HC system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the HC system 202 that may efficiently provide a platform for implementing a cloud native HC module, but the disclosure is not limited thereto.

The client devices 208(1)-208(n) may run interface applications, such as standard web browsers or standalone client applications, which may provide an interface to communicate with the HC system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the HC system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the HC system 202, the server devices 204(1)-204(n), or the client devices 208(1)-208(n), for example, may be configured to operate as virtual instances on the same physical machine. For example, one or more of the HC system 202, the server devices 204(1)-204(n), or the client devices 208(1)-208(n) may operate on the same physical device rather than as separate devices communicating through communication network(s) 210. Additionally, there may be more or fewer HC systems 202, server devices 204(1)-204(n), or client devices 208(1)-208(n) than illustrated in FIG. 2. According to exemplary embodiments, the HC system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
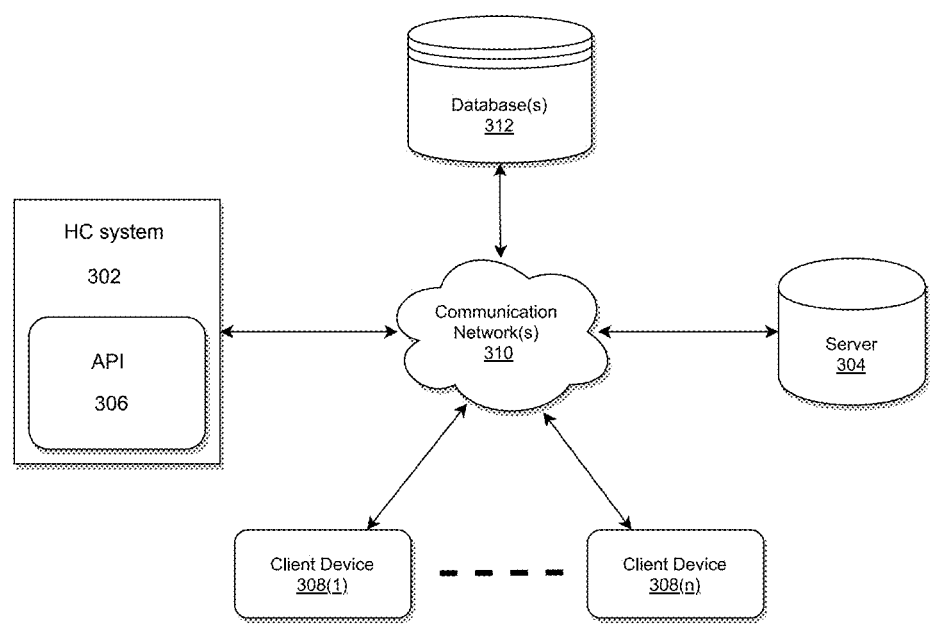
FIG. 3 illustrates a system diagram for implementing a health check system in accordance with an exemplary embodiment.

FIG. 3 illustrates a system diagram for implementing a health check system in accordance with an exemplary embodiment.

As illustrated in FIG. 3, the system 300 may include a health check (HC) system 302 within which a group of API modules 306 is embedded, a server 304, a database(s) 312, a plurality of client devices 308(1) . . . 308(n), and a communication network 310.

According to exemplary embodiments, the HC system 302 including the API modules 306 may be connected to the server 304, and the database(s) 312 via the communication network 310. Although there is only one database has been illustrated, the disclosure is not limited thereto. Any number of databases may be utilized. The HC System 302 may also be connected to the plurality of client devices 308(1) . . . 308(n) via the communication network 310, but the disclosure is not limited thereto.

According to exemplary embodiment, the HC system 302 is described and shown in FIG. 3 as including the API modules 306, although it may include other rules, policies, modules, databases, or applications, for example. According to exemplary embodiments, the database(s) 312 may be embedded within the HC system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable HC as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the HC system 302. In this regard, the plurality of client devices 308(1) . . . 308(n) may be "clients" of the HC system 302 and are described herein as such. Nevertheless, it is to be known and understood that the plurality of client devices 308(1) . . . 308(n) need not necessarily be "clients" of the HC system 302, or any entity described in association therewith herein. Any additional or alternative relationship may exist between either or both of the plurality of client devices 308(1) . . . 308(n) and the HC system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the HC system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The HC system 302 may be the same or similar to the HC system 202 as described with respect to FIG. 2, including any features or combination of features described with respect thereto.

Figure 4:
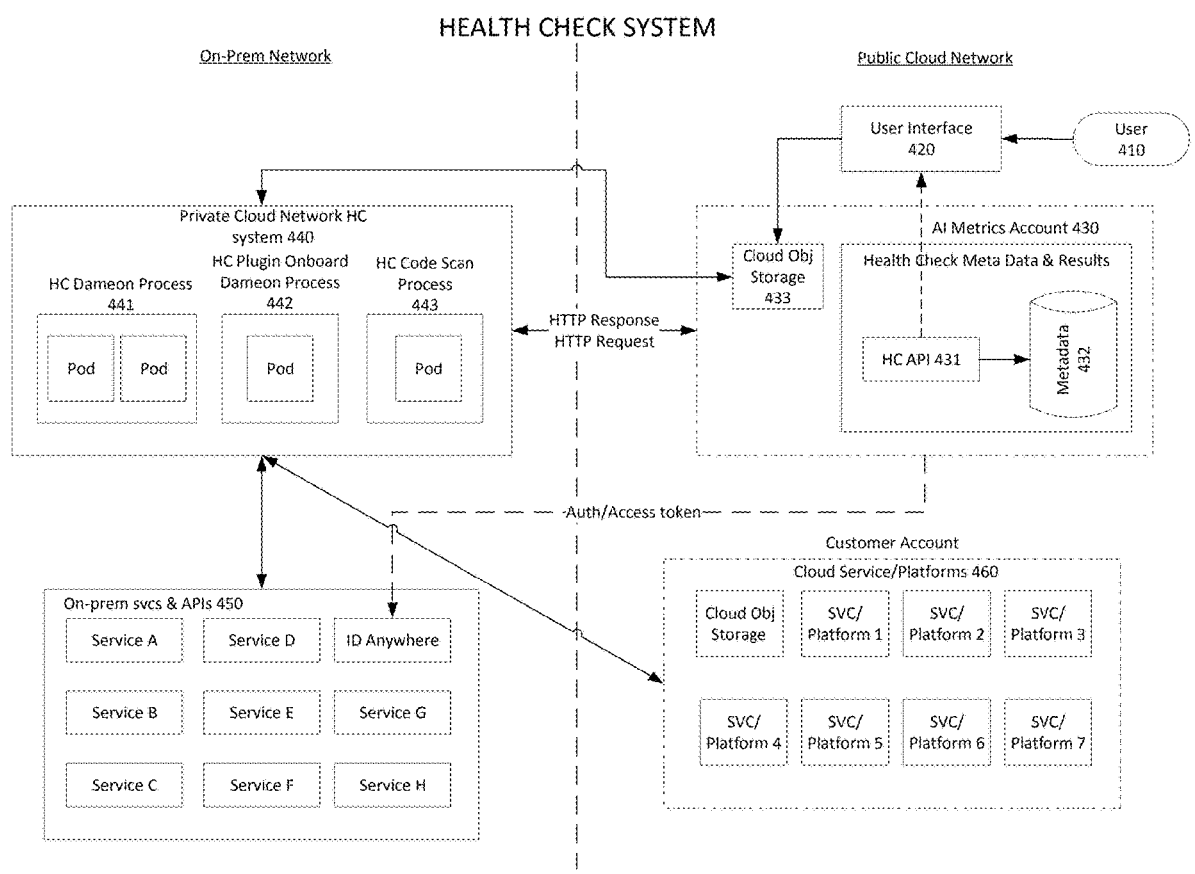
FIG. 4 illustrates a health check system diagram in accordance with an exemplary embodiment.

FIG. 4 illustrates a health check system diagram in accordance with an exemplary embodiment.

According to exemplary aspects, the health check system may be a cloud native testing automation tool that provides a centralized testing platform for testing of customized functions for various applications/APIs residing across various platforms and networks. Unlike traditional testing automation tools, which may be limited to a local testing, the health check system allows for testing of customized user configured functions for API based software running over a local network, as well as customized user configured functions for API based software running on a cloud network. Further, the health check system may allow for executing of customized user configured functions and testing thereof for API based software that includes a set of processes that involve orchestration of multiple systems/platforms and data transfers. The functions may be executed according to a schedule defined by a user (e.g., every five minutes) for performing continuous monitoring and testing of the user configured functions. Accordingly, the health check system may perform real-time or continuous monitoring of customized user configured functions built for various applications, platforms, services and/or APIs, whether the application/platform/service/API is located on-premise, on a cloud system (private/public), and/or spanning across multiple networks or platforms (e.g., local/on-premise, cloud (private/public)) and the like.

Further, the real-time monitoring of the registered customized user configured functions allows for assisting with root cause analysis (RCA), and deducing service/API uptime based on evidentiary data. More specifically, by performing testing of the registered functions at defined frequencies or intervals, breaks in applications/APIs may be identified quickly and regularly, which may help in identifying a root cause for the breaks. For example, if same type of error occurs for a predetermined number of times when a particular upstream operation is executed, it may be determined that the function may conflict with the upstream operation. Moreover, based on the regular monitoring of the customized user configured functions, uptimes of various applications/services/APIs may be monitored in real-time to provide uptime/down time metrics to relevant stakeholders. In addition to the above, the health check system may allow for performing of a regression test on system integration testing (SIT) for various new features released into one or more system networks via customized functions.

In addition to the above, based on the analytics acquired through regular testing of the registered customized user configured functions, custom reports may be generated for the collected data associated with the executed functions (e.g., uptime, downtime, cause of failures, frequency of failures, performance metrics and the like). Further, data analytics may be performed on the collected data. For example, SQL based analytics may be performed on the collected data for obtaining additional data insights, such a frequency of certain breaks, common causes for breaks, downstream effects and the like. However, aspects of the present disclosure are not limited thereto, such that artificial intelligence (AI) or machine learning (ML) algorithms may additionally be applied to the collected data for obtaining additional insights for making systematic improvements (e.g., anticipate potential breaks based on certain upstream processes).

In an example, AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

Components of the health check system may be located over both an on-premise network and a public cloud network. The health check system may be configured to work with both applications and APIs residing in on-premise (on-prem) network systems as well as applications, services and/or APIs residing on a public cloud network. The on-premise network system may include a private cloud network as well as other on-premise network services or platforms that may be accessed by the private cloud network. The private network may also access various services and platforms provided by the public cloud network on a customer account. The services and platforms provided by the public cloud network may be accessed by using a user or a customer functional identification (ID).

Initially, a user 410 may create a new user configured function for a target application, API, platform or service. The new function may be created and registered via a user interface (UI) 420 provided by the health check system. The UI 420 may be driven by a health check API 431. The health check API 431 may be a heath check database API, which may run as a part of an auto scaling operation on a cloud network. According to exemplary aspects, processes that are running in the private cloud network may perform fetch and update operations on a metadata database 432 using health check database API end points. Further, the endpoints may be protected by IDAnywhere service, which is one of the services that may be available on a local or on-premise network.

During the registration of the new function, the new function may be provided along with corresponding metadata file or meta file. Also, during the registration, the user may specify a frequency for executing the registered function. For example, the user may specify that the registered function is to be tested every five minutes. However, aspects of the present disclosure is not limited thereto, such that the specified frequency may be adjusted by the health check system for system performance, based on stability of the registered function, as determined by one or more AI or ML algorithms, and other attributes. Further, in an example, the meta file may refer to a file containing information that describes or specifies another file, such as the registered function file. The meta file corresponding to the registered function may be saved in a metadata database 432. In addition, status of the registered function may also be stored and updated in the metadata database 432. In an example, the metadata database 432 may be a single database or may refer to a set of databases. The metadata database 432 may include, without limitation, a plugin master table, a health check master table, and a health check metrics table.

Further, during the registration of a user configured function, the UI 420 driven by the health check API 431 may expect a function file, a meta file, and an optional update key to update an existing health check record. The UI 420 may validate the meta file if no validation errors are triggered, and then uploads the function file and the metadata file to a cloud object storage 433. The health check UI 420 may also insert a record into the metadata database 432 or a health check plugin table included therein. However, if the meta file validation results in failure, the health check UI 420 may return an appropriate failure message and aborts upload to the cloud object storage 433. In an example, the UI 420 may be protected by IDAnywhere service and the UI 420 may be exposed using a hypertext transfer protocol secure (https) protocol. The AI metrics account 430 may transmit authentication/access token to the IDAnywhere service of the on-prem services and APIs 450 for authentication.

The UI 420 may also provide a registration status of the function submitted for registration. According to exemplary aspects, the UI 420 may accept a seal ID, which may be provided in the metadata file while registering a corresponding function. The UI 420 may then fetch records for the seal ID from a metadata table and provide a display in a readable format. The display may indicate the registration status of the function submitted for registration.

Once a function a registered via the health check system, continuous regression or functional tests may be run for the registered function at predetermined or specified intervals. For example, the regression or functional tests may be set to be executed every five minutes. Similarly, continuous performance tests may be executed for the registered function. According to exemplary aspects, time metrics may be captured for the regression or functional tests. Based on the continuous tests, performance metrics and failure incidents may be continuously recorded for further analysis, such as SQL based analytics. At least since tests are performed at set intervals, failures may be immediately notified for resolution. Further, stakeholders may be able to track service uptimes and service level agreement (SLA), and monitor failures and performance based on the continuous tests performed for the registered functions.

Further, the new function may be prepared in Python programming language, which may be commonly utilized by both business users as well as developers/engineers. However, aspects of the present disclosure are not limited thereto, such that different language or little/no code automated coding mechanism may be utilized. The created function may then be stored in a cloud object storage 433 provided on an AI platform metrics account 430. Once the function is provided in the cloud object storage 433 of the AI platform metrics account 430, it may be then be accessible by the private cloud network health check system 440. Further, health check Dameon process 441, health check plugin onboard Dameon process 442, and/or health check code scan process 443 residing on the private cloud network health check system 440 may be performed on the registered function.

According to exemplary aspects, health check Dameon process 441 pools metadata database or health check master table at predetermined intervals (e.g., every one minute), and schedules and runs the registered functions as separate threads. Once a registered function is executed to completion, the health check Dameon process captures output returned by the function (e.g., success/failure message), and updates the metadata database or the health check master table.

According to exemplary aspects, health check plugin onboard Dameon process 442 polls the metadata database or a health plugin table at predetermined intervals (e.g., every one minute) using health check API get endpoint and fetches any pending functions registered by users. Then, the health check plugin onboard Dameon process 442 scans imports and installs any missing packages from its repository, and tests the functions for runtime errors and validates return parameters to ensure the functions return appropriate result types that satisfy metrics table schema. If a function executes successfully, the health check plugin onboard Dameon process 442 will then schedule the function by adding/updating the health check master table and changing the status in the health check plugin table to "scheduled" or a similar status identifier. On the other hand, if a function's execution results in failure, the health check plugin onboard Dameon process 442 updates a status to an appropriate failure status in health check plugin table.

The health check code scan process 433 may perform a scanning operation of functions being registered or uploaded by user. The scanning operation may perform initial check on the functions before being uploaded or executed in the health check system.

Moreover, as exemplarily illustrated in FIG. 4, the health check system may be implemented by one or more system components residing on the on-premise network and public cloud network. According to exemplary aspects, a private cloud network health check system 440 residing in the on-premise network and an AI metrics account 430 residing on the public cloud network may collaborate together to implement or form the health system of FIG. 4. Further, the private cloud network health check system 440 may communicate with the AI metrics account 430 by submitting and receiving HTTP Response and HTTP Request.

In addition, POD logs may be generated and transmitted from the private cloud network health check system 440 to the AI metrics account 430. According to exemplary aspects, as the health check system executes, it may generate logs which are then immediately streamed to a results database for viewing by users of the health check system. These logs may provide key insights into how the health check execution occurred and other corresponding details that the health check system is configured to track during the execution of the health check.

The private cloud network health check system 440 may access or call one or more services included in the on-premise services and APIs 450. In an example, the one or more services in the on-premise services and APIs 450 may be accessed using a user functional identification (FID). On-premise services may include a variety of services, including ID Anywhere, service A, service B, service C, service D, service E, service F, service G and service H. Although nine services are illustrated as being provided in the on-premise services and APIs 450, aspects of the present disclosure are not limited thereto, such that more or less services and APIs may be available for selection.

Further, the private cloud network health check system 440 may access one or more cloud services or platforms 460 via a customer account on the public cloud network. In an example, the one or more cloud services or platforms 460 may be accessed using a user FID. The cloud services or platforms 460 includes a cloud object storage, svc/platform 1, svc/platform 2, svc/platform 3, svc/platform 4, svc/platform 5, svc/platform 6 and svc/platform 7. In an example, one or more of the cloud services or platforms included in the cloud services or platforms 460 may be standard or added-on cloud service or platform provided in the public cloud network. Although eight cloud service/platforms are illustrated as being provided, aspects of the present disclosure are not limited thereto, such that more or less cloud service/platform may be provided.

Based on the above noted configuration, the health check system may be able to register a function for a target application/API/service/platform and test such a function, whether the target application/API/service/platform resides on a private cloud network, on-premise network, or a public cloud network. Further, even for applications that interacts across multiple networks or platforms may be tested as the health check system allows for access across multiple networks/systems/platforms (e.g., the private cloud network, the on-premise network, and/or the public cloud network). Accordingly, based on the above, customized user configured functions may be tested without restriction across various networks and simply by registration of a function to the health check system.

As noted above, the health check system provides a single integrated test environment for an entire technology stack encompassing various platforms. By providing such configuration, where the health check system crosses over various platforms in an organization's ecosystem, an integrated testing or end-to-end testing may be performed for a function regardless of where a corresponding application may reside, including cloud networks (e.g., local/on-premise, private cloud network, public cloud network or the like) by registering the function to the health check system. More specifically, the integrated testing may be performed without performing individual unit/functional testing for various components residing in different networks that are called by the registered function during its execution. As individual unit/function testing may be unnecessary for the various components for performing of the integration testing in the health check system, separate testing environments may not be necessary to be set up, which results in conservation of technical resources (e.g., CPU and memory resources) that would otherwise have to be expanded.

Further, at least the health check system tests the registered functions at regular intervals, continuous regression and/or performance tests may be performed on the registered functions. Based on the acquired results, various inefficiencies and failures may be tracked for making future adjustments and improvements. The acquired results, including of failures, may be displayed on a dashboard for monitoring of failures and performance (e.g., CPU utilization, RAM utilization, I/O, network and the like), which may additionally trigger alerts to be provided to developers/engineers for fixes. In addition to the above, SQL based analytics may be provided based on the acquired data for reporting of function/application/system performance. Moreover, one or more AI or ML algorithms may be leveraged to further provide additional insights and/or recommendations for improvements.

Figure 5:
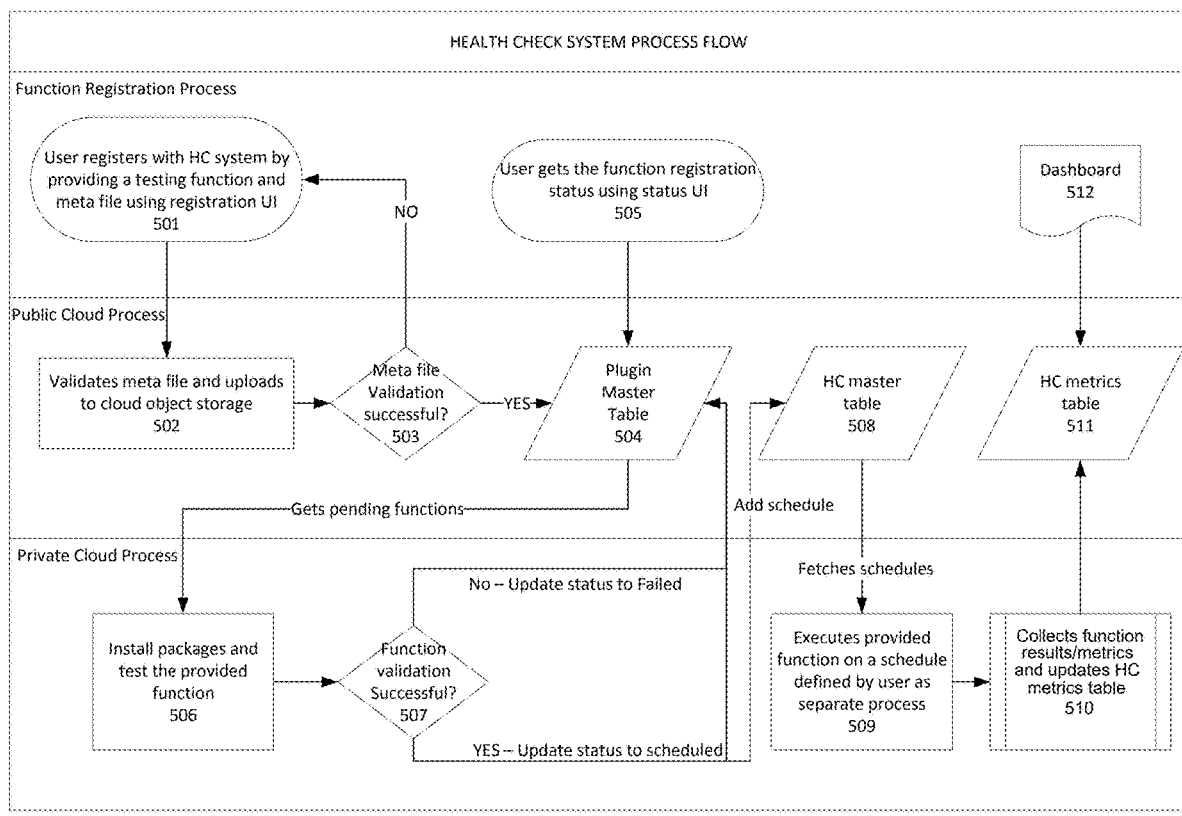
FIG. 5 illustrates a health check system process flow in accordance with an exemplary embodiment.

FIG. 5 illustrates a health check system process flow in accordance with an exemplary embodiment. More specifically, FIG. 5 illustrates interactions between three separate flows, namely, a function registration process, a public cloud process, and a private cloud process.

In operation 501, a user registers with the health check system by providing a program function (e.g., Python function) and corresponding meta files via a user interface provided by a health check system component. More specifically, the program function may be registered using a registration user interface provided on an AI metrics account platform provided on a public cloud network. The operation 501 is part of the function registration process. According to exemplary aspects, the program function and the corresponding meta files may then be stored on a cloud object storage provided on a AI metrics account platform, which may serve as a public cloud component of the health check system. The AI metrics account platform may be provided on the public cloud network, and may include a health check API, which may provide various user interfaces to a user of the health check system.

In operation 502, the meta file of the registered function is validated and uploaded to the cloud object storage provided for the AI metrics account platform or the public cloud network as a part of the public cloud process. In an example, the meta file may be provided in YML. However, aspects of the present disclosure are not limited thereto, such that the meta file may be provided in any suitable markup language.

In operation 503, a determination of whether the meta file has been successfully validated or not is performed on the public cloud network as a part of the public cloud process. If the validation is determined to have failed, operation 501 is repeated for providing another meta file. On the other hand, if the validation is determined to have succeeded, then the meta file is sent over to a plugin master table 504 of a metadata database residing on the public cloud network.

In operation 505, user may retrieve or view a function registration status from the updated plugin master table 504 using a status user interface.

In operation 506, the health check system component residing in the private cloud network gets or acquires pending functions from the plugin master table 504 or the metadata database, and installs corresponding packages and test the provided or the retrieved pending functions as a part of the private cloud process. According to exemplary aspects, in operation 506, health check plugin onboard Dameon process may pool the plugin master table 504 at specified time intervals using health check API get endpoint and fetches any pending functions registered by the user. The health check plugin onboard Dameon process may further scan the fetched pending functions and install missing packages from its repository. Once missing packages are installed, then the health check plugin onboard Dameon process tests the functions for runtime errors and validates return parameters to ensure that the function returns appropriate types that satisfy metrics table schema.

In operation 507, the health check plugin onboard Dameon process determines whether the function validation was successful or not. If the function execution results in failure, the health check plugin onboard Dameon process may update the status of the function to an appropriate failure status in the health check plugin table 504. On the other hand, if the functions execute successfully, the health check plugin onboard Dameon process will then schedule the function by adding or updating a health check master table 508 of a metadata database and changing the status in health check plugin table to "scheduled" or with other similar status indicator. Further, the health check Dameon process performed in the private cloud network may add a schedule to the health check master table 508 to run the function as a separate thread.

In operation 509, the health check Dameon process may pool and fetch the schedule from the health check master table 508 at a specified interval (e.g., every minute), and executes the provided function on a schedule defined by the user as a separate thread or process.

In operation 510, once the function has been executed to completion, the health check Dameon process collects function execution results (e.g., success/failure message) and/or metrics (e.g., execution time, CPU utilization, memory utilization and etc.) and updates a health check metrics table 511 or a metadata database. Once the function execution results and/or metrics are recorded on the health check metrics table 511, the recorded information may be retrieved or accessed by a dashboard 512 to provide such information to the user or other stakeholders.

Figure 6:
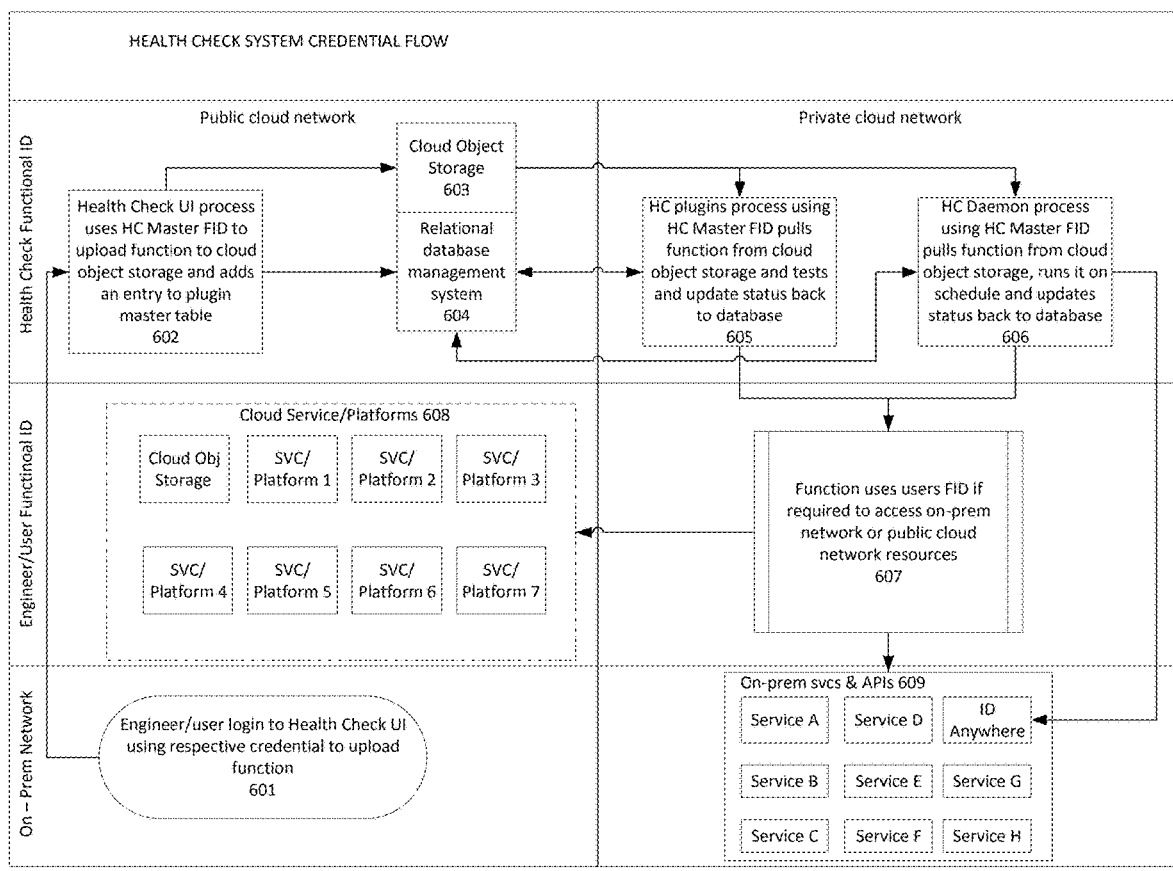
FIG. 6 illustrates a health check system credential flow in accordance with an exemplary embodiment.

FIG. 6 illustrates a health check system credential flow in accordance with an exemplary embodiment.

FIG. 6 exemplarily illustrates a relationship between a public cloud network resources/processes and a private cloud network resources/processes, as well as use of user functional ID and health check functional ID in performing health check operations.

In operation 601, an engineer or a user logs into a health check system user interface (UI) provided on a public cloud network using respective credentials to upload a created function. In an example, the function may be provided in Python. However, aspects of the present disclosure are not limited thereto, such that other function generating mechanisms or languages maybe utilized. As illustrated in FIG. 6, the engineer/user may login from a local or on-premise network.

In operation 602, the health check system UI process uses a health check master functional identification (FID) to upload the created function to a cloud object storage 603 residing on the public cloud network, and adds an entry to a plugin master table or a metadata database located in a relational database management system 604 residing on the public cloud network.

In operation 605, health check plugin onboard Dameon process is performed on the private cloud network side. More specifically, the health check plugin onboard Dameon process performs a health check plugin process using the health check master FID for pulling the registered function from the cloud object storage, and scans the pulled function and installs any missing packages from its repository. Once ready, the health check plugin process tests the function for runtime errors and validates return parameters to ensure that the function returns appropriate return types that satisfies a metrics table schema. Results of the scan and/or the test may be provided to the relational database management system 604 for storage and/or analysis.

In operation 606, health check Dameon process is performed on the private cloud network side. More specifically, the health check Dameon process uses the health check master FID to pull the function from the cloud object storage, sets an execution schedule in accordance with a setting provided by the user, and runs the function in accordance with the set execution schedule. Upon execution, the health check Dameon process determines whether the function validation was successful or not. Based on the validation results, the health check Dameon process updates a status of the function to the relational database management system 604. Further, if the validation results was successful, the health check Dameon process additionally adds an execution schedule to the relational database management system 604.

In operation 607, the registered function uses the user's (or the engineer's) FID if such is required to access the on-prem services and APIs 609 provided on the local or on-prem network, or the public cloud network resources, such as one or more of the cloud service/platforms 608.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing a health check on a user configured function, the method comprising:
   performing, using a processor and a memory:
      submitting, via a user interface and over a public cloud network, a function and a corresponding meta file to a health check system;

uploading the function to a cloud object storage and storing in the cloud object storage;
validating the meta file;
when the meta file is validated, sending a validation result to a plugin master table of a metadata database for storage, and retrieving the function from the cloud object storage by a private cloud network;
validating, on the private cloud network, the function;
when the function is validated, updating a status of the function in the plugin master table, and adding a schedule for execution of the validated function to a health check master table of the metadata database;
fetching the added schedule of the validated function at a predetermined interval for scheduling of execution of the function;
scheduling the function for execution according to a schedule defined for the function;
executing the function as specified in the defined schedule as a separate process; and
acquiring results of the executed function and updating a health check metrics table of the metadata database with the acquired results.

2. The method according to claim 1, further comprising: acquiring metrics corresponding to the results of the executed function and updating the health check metrics table.

3. The method according to claim 2, further comprising: accessing information stored in the health check metrics table; and
displaying a portion of the accessed information from the health check metrics table on a dashboard provided on a display screen.

4. The method according to claim 2, further comprising: accessing information stored in the health check metrics table;
performing a database query on the health check metrics table for performing analytics; and
generating a report based on the performed database query.

5. The method according to claim 4, wherein the report indicates an uptime for an application or API corresponding to the function executed.

6. The method according to claim 1, wherein the define schedule specifies a frequency of execution of the function.

7. The method according to claim 1, wherein the executing of the function includes calling a service provided on at least one of the private cloud network, the public cloud network, and an on-premise network.

8. The method according to claim 1, wherein the health check system includes components from both the private cloud network and the public cloud network.

9. The method according to claim 1, wherein the function is for an application or an API residing on the private cloud network, the public cloud network, or an on-premise network.

10. The method according to claim 1, wherein a system integration testing is performed for the function by submitting the function and the corresponding meta file, and by specifying a testing environment on the user interface.

11. The method according to claim 1, wherein the executing of the function includes performing a regression test on the function.

12. The method according to claim 1, wherein the executing of the function includes performing a performance test on the function.

13. The method according to claim 1, further comprising:
repeating execution of the function at a frequency specified in the defined schedule; and
acquiring additional results of the executed function every time the function is executed, and updating the health check metrics table with the acquired additional results.

14. The method according to claim 1, wherein a health check master functional identification (ID) is used to submit the function, and
the health check master functional ID is used to retrieve the function from the cloud object storage.

15. The method according to claim 1, wherein a user's functional ID is used to access one or more services, APIs or platforms from the private cloud network and the public cloud network when executing the function.

16. The method according to claim 1, wherein the function is retrieved from the cloud object storage at predetermined intervals.

17. The method according to claim 1, wherein the function is retrieved from the cloud object storage and validated by a health check plugin onboard Dameon process executed on the private cloud network.

18. The method according to claim 1, wherein the validating of the function includes:
scanning the function and installing missing packages;
testing the function for runtime errors; and
validating return parameters.

19. A system for performing a health check of a user configured function, the system comprising:
at least one processor;
at least one memory; and
at least one communication circuit,
wherein the at least one processor is configured to:
submit, via a user interface and over a public cloud network, a function and a corresponding meta file to a health check system;
upload the function to a cloud object storage and store in the cloud object storage;
validate the meta file;
when the meta file is validated, send a validation result to a plugin master table of a metadata database for storage, and retrieve the function from the cloud object storage by a private cloud network;
validate, on the private cloud network, the function;
when the function is validated, update a status of the function in the plugin master table, and add a schedule for execution of the validated function to a health check master table of the metadata database;
fetch the added schedule of the validated function at a predetermined interval for scheduling of execution of the function;
schedule the function for execution according to a schedule defined for the function;
execute the function as specified in the defined schedule as a separate process; and
acquire results of the executed function and updating a health check metrics table of the metadata database with the acquired results.

20. A non-transitory computer readable storage medium that stores a computer program for performing a health check of a user configured function, the computer program, when executed by a processor, causing a system to perform a process comprising:
submitting, via a user interface and over a public cloud network, a function and a corresponding meta file to a health check system;

uploading the function to a cloud object storage and storing in the cloud object storage;

validating the meta file;

when the meta file is validated, sending a validation result to a plugin master table of a metadata database for storage, and retrieving the function from the cloud object storage by a private cloud network;

validating, on the private cloud network, the function;

when the function is validated, updating a status of the function in the plugin master table, and adding a schedule for execution of the validated function to a health check master table of the metadata database;

fetching the added schedule of the validated function at a predetermined interval for scheduling of execution of the function;

scheduling the function for execution according to a schedule defined for the function;

executing the function as specified in the defined schedule as a separate process; and acquiring results of the executed function and updating a health check metrics table of the metadata database with the acquired results.

\* \* \* \* \*